United States Patent [19]

Buide et al.

[11] 3,889,001

[45] June 10, 1975

[54] HYDROLYZED PROTEIN IN NON-DAIRY WHIPPED TOPPING

[75] Inventors: Norma F. Buide, New York; Joaquin C. Lugay, Thornwood; Rex J. Sims, Pleasantville, all of N.Y.

[73] Assignee: General Foods Corporation, White Plains, N.Y.

[22] Filed: Aug. 20, 1973

[21] Appl. No.: 389,842

[52] U.S. Cl. ............................................. 426/565
[51] Int. Cl. .......................... A23g 3/00; A23g 5/00
[58] Field of Search ........................... 426/163, 164

[56] References Cited
UNITED STATES PATENTS

| | | | |
|---|---|---|---|
| 2,522,050 | 9/1950 | Lenderink | 426/163 |
| 2,846,314 | 8/1958 | Aichele et al. | 426/163 |
| 3,010,830 | 11/1961 | Berndt | 426/163 |
| 3,431,117 | 3/1969 | Lorant | 426/164 |
| 3,702,768 | 11/1972 | Finucane et al. | 426/164 |

Primary Examiner—A. Louis Monacell
Assistant Examiner—J. M. Hunter
Attorney, Agent, or Firm—Thaddius J. Carvis; Daniel J. Donovan

[57] ABSTRACT

A whipped, dessert-type product is provided in which the protein is replaced with a small but effective amount of a protein hydrolysate wherein the hydrolysate is functional in extremely low amounts, e.g. on the order of about 0.005 to 0.01 percent.

10 Claims, No Drawings

HYDROLYZED PROTEIN IN NON-DAIRY WHIPPED TOPPING

BACKGROUND OF THE INVENTION

The present invention relates to a whipped, dessert-type product. More particularly, the invention relates to whipped products of the oil-in-water emulsion type.

The production of stable, especially freeze-thaw stable, whipped oil-in-water emulsions has long troubled those skilled in the art. Prior successful products of this type have required the use of protein in relatively large amounts. It was believed that the protein had the dual function of emulsifier and stabilizer. Now, according to the present invention, the high level of protein is replaced by a small but effective amount of a protein hydrolysate.

Enzymatic digestion or hydrolysis of proteinaceous materials is well known for a wide variety of purposes. These include making proteins more readily usable by the human body, altering their flavor and/or aroma, and employing them for whipping agents in non-fat-containing food products. For example, in U.S. Pat. No. 2,588,419 to H. E. Sevall et al., a whipping composition for preparing whipped products of high sugar content is disclosed comprising water soluble degraded soy protein and sodium phosphate. The sodium phosphate serves as a stabilizer for the degraded protein when the composition is whipped in an aqueous medium. No fat is employed in the whipped products disclosed by this reference. In Canadian Pat. No. 663,556, R. J. Moshy discloses the use of hydrolyzed fish protein as a whipping agent for desserts and the like. However, Example IV discloses that the whipped products prepared in accordance with the teachings of that invention have an oil stability of well under 1 percent.

Thus, while the art has long been aware of both freeze-thaw stable whipped oil-in-water emulsions containing proteins and non-fat containing whipped products containing hydrolyzed protein, no one has heretofore recognized that a protein hydrolysate could be employed in whipped oil-in-water emulsion systems to at least partially replace the protein, and that these whipped products would have freeze-thaw stabilities equal to those employing the full supplement of protein.

Because of its taste, availability and functionality, sodium caseinate has become one of the most widely used proteins for use in whipped oil-in-water emulsion systems. However, sodium caseinate is expensive, especially when used at the relatively high levels which have been required according to the prior art. Moreover, the increased demand for sodium caseinate in recent years has, to at least a limited extent, diminished the relative certainty that sufficient quantities of this material will be available as required.

Accordingly, it is an object of the present invention to provide a whipped oil-in-water emulsion system wherein the need for high levels of sodium caseinate is eliminated.

It is another object of the present invention to provide a freeze-thaw stable, whipped oil-in-water emulsion system which does not employ a protein such as sodium caseinate.

It is another object of the present invention to provide a freeze-thaw stable, whipped oil-in water emulsion system which has a texture and mouthfeel similar to that of natural whipped cream.

It is another object of the present invention to reduce the cost of freeze-thaw stable whipped, oil-in-water emulsion systems by eliminating the need for sodium caseinate or other protein.

These and other objects are accomplished according to the present invention which provides an oil-in-water emulsion system comprising fat, water, carbohydrate, non-proteinaceous emulsifiers and stabilizers and a small but effective amount of a protein hydrolysate. The hydrolysate of sodium caseinate is preferred, and is functional at concentrations of less than 0.5 percent, and as low as about 0.005 to 0.01 percent. Thus, according to the present invention, proteins previously required by the prior art in amounts ranging from about 0.5 to 2 percent are replaced by protein hydrolysates. These hydrolysates function surprisingly well in oil-in-water emulsion systems and provide significant cost savings without sacrificing freeze-thaw stability.

DETAILED DESCRIPTION OF THE INVENTION

The whipped, dessert-type compositions of the present invention do not require the use of protein as such but employ instead modified proteins, i.e. protein hydrolysates. These compositions can, and preferably do, totally eliminate the use of proteins such as sodium caseinate; however, the presence of proteins are in no manner detrimental to the objects of the present invention and can be employed if desired. When an effective amount of protein hydrolysate is employed, the extra expense of the sodium caseinate or other protein is not justified for any increase in functionality. Certain proteins, such as sodium caseinate, do, however, impart a desirable flavor. It is therefore within the purview of the present invention to employ a limited, but less than effective amount, of the sodium caseinate or other protein and compensate for any deficiency in functionality with the addition of an amount of a protein hydrolysate. Thus, for the purposes of the present invention, an effective amount of protein hydrolysate is defined to mean an amount which by itself or in combination with a protein such as sodium caseinate provides sufficient functionality to impart good freeze-thaw stability to whipped toppings of the type described herein.

The hydrolysate can be obtained from commercial sources or prepared according to any known, suitable method. It can be derived from any number of edible proteinaceous sources. Protein substances preferred as source materials are naturally confined to those available in quantity and at reasonable cost. Prominent among these are casein, sodium caseinate, soy protein, egg white protein, egg yolk protein, milk whey protein, fish protein, cottonseed protein, sesame protein, and meat protein. It is presently believed that proteins highest in organic phosphorus are to be preferred according to the present invention. Thus, sodium caseinate is a highly preferred protein source.

Any of the known procedures for hydrolyzing protein which can reduce the molecular size of the protein material to an average molecular weight of from about 300 to about 15,000, and preferably from about 1,000 to 7,000 can be employed. Preferably, the proteins are treated with an edible bacterial proteinase under controlled conditions to give a limited amount of hydrolysis. Typical of the enzymes which can be used alone or in combination to obtain the desired hydrolysis are papain, bromelin, ficin, pepsin, trypsin, chymotrypsin, bacterial protease (e.g. from from *B. subtilis*), and fungal protease (e.g. from the *aspergillus oryzae-niger* group). These enzymes, used alone or in combination at the desired reaction conditions, effectively hydrolyze the proteins to the desired degree. Typically, the protein is dispersed in distilled water at a temperature of from about 25°–60°C under mild agitation. The protein can be employed at concentrations of from about 5–25 percent based on the weight of the dispersion. The enzyme is added in an amount ranging from about 0.1 to about 1.0 percent based on the weight of the protein. The pH of the reaction mixture is controlled in known manner at from about 2 to 9 during the hydrolysis. The hydrolysis may take from about 2 minutes to about 7 hours depending upon the particular reaction conditions, protein sources and enzymes employed within the suggested guidelines. The hydrolysate can be used as is or separated and dried.

It is not unusual, due to the use of particular protein sources or processing techniques, for the hydrolysate to have an off flavor. The presence of an off flavor does not indicate a decreased functionality of the hydrolysate and, in most cases, is not noticeable when the hydrolysate is employed at low levels. Where desired, the impact of the off flavor can be reduced by known techniques, including masking by complimentary flavors.

The nature of the fat employed in the oil-in-water emulsion is not critical to the present invention. Fats having a high solids content at the proposed whipping and storage temperatures and a rapid melt down to a low solids content at body temperature are particularly preferred. The usual topping fats of coconut origin are acceptable. For example, coconut oil which has been hydrogenated to have a melting point of about 90°–94°F is especially suitable. Further exemplary of fats which can be employed according to the present invention are hydrogenated cottonseed oil, hydrogenated corn oil, hydrogenated soybean oil, hydrogenated peanut oil, hydrogenated olive oil, etc. This list is by no means exhaustive, but is merely exemplary of fats which may be employed. The selection of a particular fat or combination of fats is limited only by the considerations that it be edible and provide the desired working and eating characteristics.

A carbohydrate is generally employed in the composition to provide the desired sweetness. Thus, sugars such as sucrose, dextrose, glucose, lactose, maltose, invert sugar, and mixtures thereof may be utilized. Some carbohydrates such as dextrose may also be employed for their water binding characteristics. Other carbohydrates such as starches can be added where a modified somewhat pudding-like consistency is desired.

Emulsifiers are necessary ingredients of the composition of the present invention and can be added in amounts on the same order as in the prior art compositions requiring protein. A wide variety of emulsifiers may be employed. Among the more suitable are: hydroxylated lecithin; mono- or diglycerides of fatty acids, such as monostearin and dipalmitin; polyoxyethylene ethers of fatty esters of polyhydric alcohols, such as the polyoxyethylene ethers of sorbitan monostearate or sorbitan distearate; fatty esters of polyhydric alcohols, such as sorbitan monostearate; mono- and diesters of glycols and fatty acids, such as propylene glycol monostearate and propylene glycol monopalmitate; and of carboxylic acids such as lactic, citric, and tartaric acids with the mono- and diglycerides of fatty acids such as glycerol lacto palmitate and glycerol lacto oleate. The fatty acids employed in the preparation of the emulsifiers include those derived from beef tallow, and coconut, cotton-seed, palm, peanut, soybean and marine oils. Preferably a combination of emulsifiers is employed, particularly, polyoxyethylene (20) sorbitan monostearate and sorbitan monostearate.

The whipped, dessert-type compositions of the present invention also include one or more non-proteinaceous stabilizers. These stabilizers are preferably natural, i.e., vegetable, or synthetic gums and may be, for example, carrageenin, guar gum alginate, and the like or carboxymethylcellulose, ethylcellulose ether and the like, and mixtures thereof. Typically, a gum or combination of gums is employed with a sugar, e.g. dextrose, carrier. It is an advantage of the present invention that the amount of these stabilizers necessary can be reduced over the amounts required in prior art whips containing protein.

Other ingredients known to those skilled in the art may also be employed to impart their characteristic effects to the frozen whipped topping compositions of the present invention. Typical of such ingredients are flavoring agents, colorants, vitamins, minerals, and the like. Suitable flavoring agents can be employed to impart vanilla, cream, chocolate, coffee, maple, spice, mint, butter, caramel, fruit and other flavors. Additionally, the use of certain polyols such as sorbitol and manitol can be employed to modify the mouthfeel of the topping. Furthermore, other additives such as phosphates and the like may be employed for their known functions.

The amounts of fat, modified protein, emulsifier, stabilizer, carbohydrate, and optionally included ingredients as well as the amount of water employed in the preparation of whipped, dessert-type compositions according to the present invention can be varied over relatively wide limits. The amount of fat will be sufficient to provide a stable whip which has good mouthfeel and yet, upon melting, does not leave an undesirable film on the palate. Sufficient amounts of modified protein, emulsifier and stabilizer will be used to impart good whipping properties to the composition and to afford some stability to the whip. Further, the amount of carbohydrate will be varied over a range sufficient to impart the desired sweetness level to the composition. The relative amounts of ingredients used will generally fall within the following ranges:

| Ingredient | Weight % | |
|---|---|---|
| Fat | 10 | – 30 |
| Emulsifier | 0.5 | – 2.0 |
| Stabilizer | 0.05 | – 2.0 |
| Water | 40 | – 60 |
| Carbohydrate | 20 | – 30 |
| Flavoring agent | 0.5 | – 2.0 |
| Colorant | 0.01 | – 0.05 |
| Protein Hydrolysate | 0.005 | – 1.5 |

The relative amounts of these ingredients can be widely varied depending upon the degree of whip and the mouthfeel desired of the final product. Higher overruns, i.e., higher degrees of whip, can be employed to obtain whipped-cream-like toppings. Lower overruns will impart an ice-cream-like consistency to the composition when frozen. A prime feature of the present invention is that whipped-cream-like toppings, which are freeze-thaw stable can be obtained without the use of a protein such as sodium caseinate. The composition of the present invention provides whipped toppings of this nature having overruns of over 200 percent (i.e., 1 part emulsion to two parts air, by volume) and the consistency and mouthfeel of natural whipped cream at hydrolysate concentrations well below 0.5 percent (e.g., at about 0.005 to 0.01 percent by weight).

A preferred method for preparing a whipped topping product comprises blending all of the ingredients such as flavoring agents and coloring, in the desired ratios. The ingredients are heated prior to or during blending. The blended ingredients are then passed through a homogenizer of the typical dairy type. Although homogenization may be accomplished in one stage, it is carried out in two stages for best results. Preferably, the pressure during the first stage is maintained at a minimum of about 6,000 psi and a maximum of about 10,000 psi, most preferably about 7,500 psi, and the pressure during the second stage is maintained at about 500 psi. The mix is usually maintained at a temperature of from about 110° to 160°F during homogenization. The carbohydrate and the optionally included ingredients may be added either before or after homogenization to form a whippable emulsion. This emulsion is cooled to temperature of from about 35° to 75°F and passed through a whipper for the incorporation of air or an inert gas such as nitrogen, carbon dioxide, nitrous oxide or the like. The whipper may be of conventional construction such as a Votator heat exchanger that permits cooling of the emulsion to temperatures of about 35° to 50°F during whipping. The emulsion can be whipped to an overrun of about 250 percent, packaged and frozen.

The frozen, whipped topping prepared in this manner remains smooth after several freeze-thaw cycles, and does not curdle upon prolonged refrigerator storage. To use the frozen, whipped-topping composition, the product is simply defrosted, for example, by being left overnight in the refrigerator.

The following examples are presented for the purposes of further illustrating and explaining the present invention, and are not to be taken as limiting in any sense. Unless otherwise indicated all parts and percentages are by weight.

EXAMPLES 1-3

The following three examples summarized in Table 1 illustrate the present invention and compare it to a prior art composition containing protein. Example 1 illustrates an optimized prior art whipped topping composition employing sodium caseinate. Examples 2 and 3 illustrate the composition of the present invention and employ a hydrolysate of sodium caseinate in place of the sodium caseinate. In each example the dry ingredients, i.e. the sucrose, stabilizer and hydrolysate were blended together and dispersed in tap water at 60°C using a mechanical stirrer. The fat (Wecotop A hydrogenated coconut oil, having a melting point of about 92°F) was melted and added to the aqueous phase. The Drewpone 60 polyoxyethylene (20) sorbitan monostearate and the Drewsorb 60 sorbitan monostearate were melted, and with the coloring and flavoring, and the other liquid ingredients, were also added to the aqueous phase and mixed for 15 minutes on a steam bath followed by blending at high speed for three minutes on a Waring Blendor to form an emulsion. The emulsion was then homogenized in a Manton-Gaulin two-stage homogenizer having a first stage pressure of 7,500 psi and a second stage pressure of 500 psi. The resultant homogenized emulsion was then chilled in ice water to 38°F. The chilled emulsion was then whipped in a five quart Hobart mixer. The amounts of the various ingredients are listed in Table 1 as parts by weight. The Brookfield viscosities of the whipped toppings were measured using a 35 millimeter T bar spindle at 20 r.p.m. on a helipath on a Syncro-Lectric viscometer. The percentage overruns were determined by weighing a known volume of whip and calculating according to the following equation:

Percent Overrun = [100 × Volume (ml)]/[Whip Weight (gm)] − 100

After freezing, thawing and storage for the indicated period at 43°F, the volume of liquid which had separated from the whip was measured. The compositions employed in and the results obtained from these examples are summarized in Table 1.

The particular hydrolysate employed in these examples was prepared from 100 parts of Land-O-Lakes sodium caseinate. The sodium caseinate was dispersed in 900 parts of distilled water at 50°C by mechanical stirring. To this dispersion, one part of bacterial proteinase (1.5 Anson units/g.*, available from Novo Industri A/S Denmark) was added. This admixture was stirred at 50°C for 2 hours. The enzyme was inactivated after reaction by heating the dispersion briefly to 80°C. The precipitated matter was separated from the liquid by centrifuging. The liquid portion was dried and employed in the amounts indicated.

(* One Anson Unit is defined as that amount of enzyme which will release the equivalent of 1 millimole/min. of tyrosine from a solution of denatured hemoglobin at pH 7.5 and 25°C.)

TABLE 1

| Component % | Example 1 | 2 | 3 |
|---|---|---|---|
| Water | 47.1 | 47.1 | 47.1 |
| Sugar | 22.6 | 22.6 | 22.6 |
| Stabilizer | 0.76 | 0.76 | 0.76 |
| Sodium Caseinate | 1.14 | — | — |
| Hydrolysate | — | 0.01 | 0.005 |
| Wecotop A | 25.76 | 25.76 | 25.76 |
| Drewpone 60 | 0.68 | 0.68 | 0.68 |
| Drewsorb 60 | 0.27 | 0.27 | 0.27 |
| Color and Flavor Evaluation | 1.64 | 1.64 | 1.64 |
| Whipping Time (min.) | 2.0–2.25 | 1.0 | 1.67 |
| Viscosity | 25–40 | 45 | 37 |
| % Overrun | 230–270 | 236 | 264 |
| Stability (days) | 14 | 14 | 14 |
| (ml/pt) | 0 | 0.3 | 0 |

EXAMPLES 4-15

Examples 4–15 compare whips prepared with hydrolysates according to the present invention to those prepared with sodium caseinate at relatively low gum levels. The whips were prepared and evaluated according to the procedures employed in Examples 1–3. In these Examples, zero hydrolysis time indicates unhydrolyzed sodium caseinate. The whips had the following formulations:

| Ingredient | wt. % Ingredients Examples 4–9 | Examples 10–15 |
|---|---|---|
| Water | 48.0 | 48.0 |

-Continued

| Ingredient | wt. % Ingredients Examples 4-9 | Examples 10-15 |
|---|---|---|
| Sucrose | 23.60 | 23.04 |
| Carrageenan | .04 | .04 |
| Guar Gum | .01 | .01 |
| Na Caseinate Hydrolysate* | .01 | .57 |
| Wecotop A | 25.76 | 25.76 |
| Drewpone-60 | .68 | .68 |
| Drewsorb-60 | .27 | .27 |
| Vanilla | 1.61 | 1.61 |
| Color & Flavor | .02 | .02 |

The results are summarized in Table II

TABLE II

| Example | Time of Hydrolysis (Hr.) | Hydrolysate or NaCaseinate Conc. (wt. %) | Overrun (%) | Brookfield viscosity | Whip Time (min.) | Stability (ml. of liquid separated) 1 day | 3 days | 1 week |
|---|---|---|---|---|---|---|---|---|
| 4 | 0.25 | 0.01 | 238 | 60 | 1.25 | 2.5 | 3 | 3 |
| 5 | 1 | 0.01 | 243 | 60 | 1.25 | 3 | 3 | 3 |
| 6 | 2 | 0.01 | 250 | 43 | 1.25 | 0.1 | 0.1 | 0.1 |
| 7 | 4 | 0.01 | 340 | 36 | 1.42 | 0.1 | 0.1 | 0.1 |
| 8 | 7 | 0.01 | 274 | 45 | 1.25 | 3 | 3 | 3 |
| 9 | 0 | 0.01 | 161 | 67 | 1.25 | 0 | 0 | 0 |
| 10 | 0.25 | 0.57 | 228 | 35 | 1.25 | 1 | 1 | 1 |
| 11 | 1 | 0.57 | 245 | 50 | 1.25 | 0.5 | 0.5 | 0.5 |
| 12 | 2 | 0.57 | 233 | 58 | 1.25 | 0 | 0 | 0 |
| 13 | 4 | 0.57 | 216 | 67 | 1.25 | 0 | 0 | 0 |
| 14 | 7 | 0.57 | 210 | 95 | 1.25 | 0 | 0 | 0 |
| 15 | 0 | 0.57 | 224 | 18 | 2.50 | Flows | — | — |

EXAMPLES 16-27

The following twelve examples illustrate the use of various different protein hydrolysates in preparing whipped topping compositions according to the present invention. All of these hydrolysates were commercially-available, enzymatically-hydrolyzed samples from Nutritional Biochemical Co. These whips were prepared and evaluated in the same manner as those in Examples 1-3. The results are summarized in Table III.

TABLE III

| Example | Hydrolysate | Hydrolysate Conc. (wt. %) | Overrun (%) | Brookfield Viscosity | Whip Time (min.) | Stability (ml. of liquid separated) 1 day | 1 week |
|---|---|---|---|---|---|---|---|
| 16 | Soy | 0.01 | 210 | 45 | 1.25 | — | 1 |
| 17 | Soy | 0.57 | 232 | 75 | 1.25 | — | 0 |
| 18 | Lactalbumin | 0.01 | 224 | 60 | 1.25 | 5 | — |
| 19 | Lactalbumin | 0.57 | 216 | 95 | 1.25 | 5 | — |
| 20 | Yeast | 0.01 | 195 | 100 | 1.25 | — | 0 |
| 21 | Yeast | 0.57 | 171 | 100 | 1.25 | — | 0 |
| 22 | Cottonseed | 0.01 | 158 | 100 | 1.17 | — | 0 |
| 23 | Cottonseed | 0.57 | 253 | 33 | 2.5 | — | 2 |
| 24 | Gelatin | 0.01 | 182 | 100 | 1.25 | — | 0 |
| 25 | Gelatin | 0.57 | 222 | 65 | 1.25 | — | 2 |
| 26 | Casein | 0.01 | 261 | 65 | 1.25 | — | 1 |
| 27 | Casein | 0.57 | 215 | 85 | 1.25 | — | 2 |

Many modifications and variations of the present invention will be apparent to those skilled in the art upon reading the above specification. It is intended that all of these modifications and variations be included within the scope of the present invention which is defined by the following claims.

What is claimed is:

1. A whippable oil-in-water emulsion composition comprising:

a. 10 to 30 percent of a fat having a normally high solids content and a rapid melt down to a low solids content at body temperature;
   b. 20 to 30 percent carbohydrate;
   c. 40 to 60 percent water;
   d. 0.5 to 2.0 percent emulsifier;
   e. 0.05 to 2.0 percent stabilizer; and
   f. an amount, less than 0.5 percent of a protein hydrolysate having an average molecular weight of from about 300 to 15,000 which is effective to provide the ability of the composition to be whipped to an overrun of over 200 percent and also provide freeze-thaw stability.

2. A composition according to claim 1 wherein the hydrolysate is present in an amount of from about 0.005 to 0.01 percent based on the weight of the composition.

3. A composition according to claim 1 wherein the hydrolysate is a hydrolysate of sodium caseinate.

4. A composition according to claim 3 wherein the hydrolysate is present in an amount of from about 0.005 to 0.01 percent based on the weight of the composition.

5. A composition according to claim 3 wherein the hydrolysate has an average molecular weight within the range of from about 1,000 to 7,000.

6. A whipped, freeze-thaw stable, dessert-type topping composition having an overrun of over 200 percent, having good texture and being resistant to collapse, said composition being based on an oil-in-water emulsion comprising:

a. 10 to 30 percent of a fat having a normally high solids content and a rapid melt down to a low solids content at body temperature;
b. 20 to 30 percent carbohydrate;
c. 40 to 60 percent water;
d. 0.5 to 2.0 percent emulsifier;
e. 0.05 to 2.0 percent stabilizer; and
f. an amount, less than 0.5 percent, of a protein hydrolysate having an average molecular weight of from about 300 to 15,000 which is effective to provide the overrun of 200 percent and freeze thaw stability.

7. A composition according to claim 6 wherein the hydrolysate is present in an amount of from about 0.005 to 0.01 percent based on the weight of the composition.

8. A composition according to claim 6 wherein the hydrolysate is a hydrolysate of sodium caseinate.

9. A composition according to claim 8 wherein the hydrolysate has an average molecular weight of from about 1,000 to 7,000.

10. A composition according to claim 8 wherein the hydrolysate is present in an amount of from about 0.005 to 0.01 percent based on the weight of the composition.

* * * * *